(12) United States Patent
Cobb et al.

(10) Patent No.: US 9,733,440 B2
(45) Date of Patent: Aug. 15, 2017

(54) OPTICAL CONNECTORS FOR COUPLING LIGHT SOURCES TO OPTICAL FIBERS

(71) Applicant: Corning Incorporated, Corning, NY (US)

(72) Inventors: Joshua Monroe Cobb, Victor, NY (US); Carl Edgar Crossland, Horseheads, NY (US); Paul Gerard Dewa, Newark, NY (US); Barry James Kosowski, Rochester, NY (US); Peter Gerard Wigley, Corning, NY (US)

(73) Assignee: Corning Incorporated, Corning, NY (US)

( * ) Notice: Subject to any disclaimer, the term of this patent is extended or adjusted under 35 U.S.C. 154(b) by 14 days.

(21) Appl. No.: 14/689,401

(22) Filed: Apr. 17, 2015

(65) Prior Publication Data

US 2015/0309272 A1    Oct. 29, 2015

Related U.S. Application Data

(60) Provisional application No. 61/985,801, filed on Apr. 29, 2014.

(51) Int. Cl.
*G02B 6/42* (2006.01)
*F21V 8/00* (2006.01)

(52) U.S. Cl.
CPC ........... *G02B 6/4256* (2013.01); *G02B 6/001* (2013.01); *G02B 6/0006* (2013.01);
(Continued)

(58) Field of Classification Search
None
See application file for complete search history.

(56) References Cited

U.S. PATENT DOCUMENTS

| 4,220,394 A | 9/1980 | Tardy |
| 4,257,672 A * | 3/1981 | Balliet ................ G02B 6/4203 359/664 |

(Continued)

FOREIGN PATENT DOCUMENTS

| JP | 59192219 A | * 10/1984 |
| JP | 05113525 A | * 5/1993 |

(Continued)

OTHER PUBLICATIONS

International Search Report and Written Opinion PCT/US2015/027930 Dated Jul. 9, 2015.
(Continued)

*Primary Examiner* — Michelle R Connelly
(74) *Attorney, Agent, or Firm* — Svetlana Z. Short; Alex J. Kalter

(57) ABSTRACT

Optical connectors for connecting optical fiber to a light source are disclosed. In one embodiment, an optical connector includes a housing with a first end having an open aperture and a second end having a blind aperture. A chamber is disposed in the housing such that the optical axis of the housing passes through the chamber. The chamber includes a first material. A light collecting region formed from a second material is disposed in the housing between the second end of the housing and the chamber. A blind aperture is positioned in the light collecting region such that a termination of the blind aperture is spaced apart from the chamber by at least a portion of the second material. A refracting surface is disposed in the housing between the open aperture and the light collecting region such that the optical axis of the housing passes through the refracting surface.

20 Claims, 3 Drawing Sheets

(52) U.S. Cl.
CPC ......... *G02B 6/4204* (2013.01); *G02B 6/4212* (2013.01); *G02B 6/4255* (2013.01); *G02B 6/4263* (2013.01); *G02B 6/4292* (2013.01)

(56) References Cited

U.S. PATENT DOCUMENTS

| | | | |
|---|---|---|---|
| 4,877,303 A | 10/1989 | Bagi et al. | |
| 4,920,366 A | 4/1990 | Bowen et al. | |
| 5,548,676 A * | 8/1996 | Savage, Jr. | G02B 6/32 385/88 |
| 6,208,788 B1 | 3/2001 | Nosov | |
| 6,264,373 B1 | 7/2001 | Fujimori et al. | |
| 6,354,727 B1 * | 3/2002 | Toyoda | B01F 7/048 366/102 |
| 6,526,201 B1 * | 2/2003 | Mrakovich | G02B 6/4214 385/33 |
| 6,536,959 B2 * | 3/2003 | Kuhn | G02B 6/4204 385/33 |
| 6,942,398 B2 * | 9/2005 | Morioka | G02B 6/4206 264/1.1 |
| 7,280,723 B2 | 10/2007 | Tabor | |
| 7,313,302 B2 * | 12/2007 | Fincato | G02B 6/4201 385/43 |
| 8,388,234 B1 | 3/2013 | Lin et al. | |
| 8,434,949 B2 | 5/2013 | Wang et al. | |
| 8,636,422 B2 | 1/2014 | Kahle et al. | |
| 2001/0051027 A1 * | 12/2001 | Matsushita | G02B 6/4204 385/79 |
| 2003/0071318 A1 * | 4/2003 | Wang | G02B 6/4204 257/434 |
| 2003/0223131 A1 * | 12/2003 | Kuczynski | G02B 7/025 359/819 |
| 2004/0008952 A1 * | 1/2004 | Kragl | C25D 1/00 385/88 |
| 2004/0146251 A1 * | 7/2004 | Kudo | G02B 6/4206 385/88 |
| 2004/0218858 A1 * | 11/2004 | Guy | F21V 5/04 385/33 |
| 2005/0121687 A1 | 6/2005 | Yamada | |
| 2005/0202826 A1 * | 9/2005 | Yuang | G02B 7/022 455/450 |
| 2007/0031089 A1 * | 2/2007 | Tessnow | G02B 6/4298 385/49 |
| 2008/0311689 A1 * | 12/2008 | Johnson | G02B 6/4248 438/27 |
| 2009/0226139 A1 | 9/2009 | Yuang | |
| 2011/0026937 A1 * | 2/2011 | Saitou | G02B 6/4201 398/201 |
| 2012/0014647 A1 * | 1/2012 | Kanke | G02B 6/4206 385/33 |
| 2012/0275747 A1 * | 11/2012 | Kimura | G02B 6/4214 385/49 |
| 2013/0272663 A1 * | 10/2013 | Katou | G02B 6/42 385/88 |

FOREIGN PATENT DOCUMENTS

| | | | | |
|---|---|---|---|---|
| JP | WO 2012086383 A1 * | 6/2012 | ............ | G02B 6/42 |
| WO | 9106412 | 5/1991 | | |
| WO | 2006109348 | 10/2006 | | |
| WO | WO 2015168081 A1 * | 11/2015 | ........... | G02B 6/4256 |

OTHER PUBLICATIONS

"Crimp and Cleave Technology for Easy Installation of Optical Fiber Cables", www.specialtyphotonics.com_capabilities_crimp_cleave.

* cited by examiner

OPTICAL CONNECTORS FOR COUPLING LIGHT SOURCES TO OPTICAL FIBERS

RELATED APPLICATION

This application claims the benefit of U.S. Provisional Application No. 61/985,801 filed on Apr. 29, 2014 The entire teachings of these applications are incorporated herein by reference.

BACKGROUND

Field

The present specification generally relates to devices and assemblies for coupling light sources and optical fibers.

Technical Background

Optical fibers are used in a wide variety of applications in which light is delivered from a light source to a target region. For example, in some applications, such as lighting, signage, biological applications, etc., light diffusing optical fibers may be utilized such that light propagating through the light diffusing optical fiber is scattered radially outward along a length of the fiber, thereby illuminating the target region surrounding the length of the fiber. A coupling device is preferred to deliver the light from a light source to the light-diffusing fiber or other optical fiber.

A need exists for alternative optical connectors to connect a variety of light sources to light-diffusing fibers or other optical fibers.

SUMMARY

The embodiments described herein relate to devices and assemblies for coupling light sources and optical fibers.

According to one embodiment, an optical connector includes a housing with a first end and a second end positioned at opposite ends of an optical axis of the housing. The first end of the housing may include an open aperture and the second end of the housing may include a blind aperture such that the optical axis of the housing passes through the open aperture and the blind aperture. A chamber may be disposed in an interior volume of the housing such that the optical axis of the housing passes through the chamber. The chamber may include a first material disposed therein. A light collecting region may be disposed in the interior volume of the housing between the second end of the housing and the chamber such that the optical axis of the housing passes through the light collecting region. The light collecting region may be formed from a second, solid material and the blind aperture may be positioned in the light collecting region such that a termination of the blind aperture is spaced apart from the chamber by at least a portion of the second, solid material. At least one refracting surface is disposed in the housing between the open aperture and the light collecting region such that the optical axis of the housing passes through the at least one refracting surface.

In another embodiment, an optical assembly may include a housing having a chamber disposed in an interior volume of the housing. A first material may be contained in the chamber. A light collecting region may be disposed in the interior volume of the housing. The light collecting region may include a second, solid material. At least one refracting surface may be disposed in the interior volume of the housing such that a focal point of the at least one refracting surface is within the light collecting region. A light source may be coupled to the housing such that light from the light source is directed into the chamber. An optical fiber may be coupled to the light collecting region such that an input face of the optical fiber is spaced apart from the chamber by at least a portion of the second, solid material and an optical path from the light source to the input face of the optical fiber passes through the chamber, the at least one refracting surface, and at least a portion of the light collecting region.

In another embodiment, an optical assembly may include a housing having a first end and a second end positioned at opposite ends of an optical axis of the housing. The first end of the housing may include an open aperture and the second end of the housing may include a blind aperture. The optical axis of the housing may pass through the open aperture and the blind aperture. A light source may be coupled to the open aperture. An optical fiber may be positioned in the blind aperture. At least one refracting surface may be positioned between the open aperture and a termination of the blind aperture such that an optical path from the light source to an input face of the optical fiber passes through the at least one refracting surface, the optical path extending through at least two different materials between the light source and the input face of the optical fiber.

In yet another embodiment, an optical connector may include a housing having a first end and a second end positioned at opposite ends of an optical axis of the housing. A chamber may be disposed in an interior volume of the housing such that the optical axis of the housing passes through the chamber. The chamber may include a reflecting material positioned on a sidewall of the chamber. The chamber may taper from the first end of the housing to the second end of the housing such that a first diameter of the chamber at the first end of the housing is larger than a second diameter of the chamber at the second end of the housing. A light source may be coupled to the first end of the housing such that when the light source is powered on, divergent light from the light source propagates through the chamber and is reflected by the reflecting material to concentrate the light proximate the second end of the housing.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description, serve to explain the principles and operations of the claimed subject matter.

DETAILED DESCRIPTION

Figure 1:
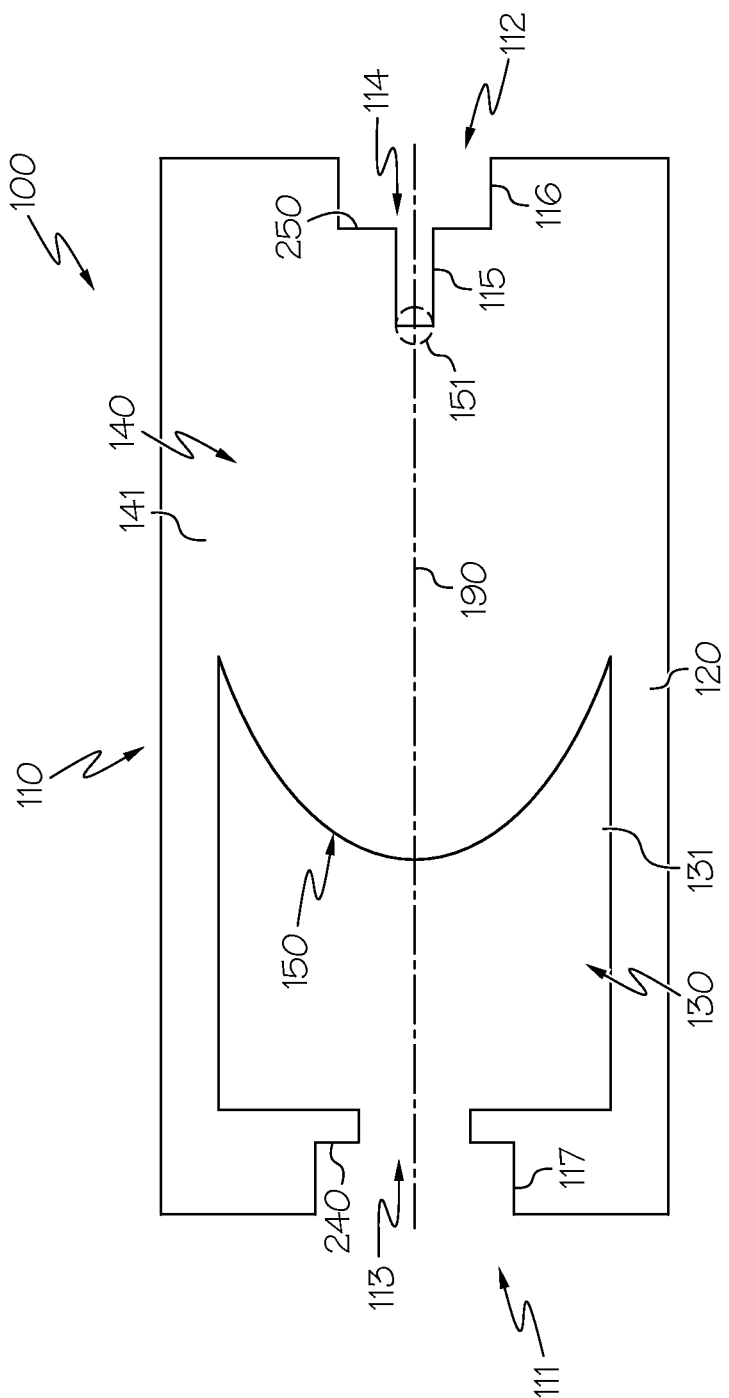
FIG. 1 schematically depicts a side view of an optical connector having an open aperture and a blind aperture according to one or more embodiments shown or described herein.

Reference will now be made in detail to embodiments of optical connectors, examples of which are illustrated in the accompanying drawings. Whenever possible, the same reference numerals will be used throughout the drawings to refer to the same or like parts. The optical connectors and assemblies described herein may connect light sources, such as laser diodes or light emitting diodes (LEDs), with an optical fiber, such as a transmission fiber or even a light-diffusing fiber (LDF). One embodiment of an optical connector is schematically illustrated in FIG. 1. The optical connector generally includes a housing with a first end and a second end positioned at opposite ends of an optical axis of the housing. The first end of the housing may include an open aperture and the second end of the housing may include a blind aperture such that the optical axis of the housing passes through the open aperture and the blind aperture. A chamber may be disposed in an interior volume of the housing such that the optical axis of the housing passes through the chamber. The chamber may include a first material disposed therein. A light collecting region may be disposed in the interior volume of the housing between the second end of the housing and the chamber such that the optical axis of the housing passes through the light collecting region. The light collecting region may be formed from a second, solid material and the blind aperture may be positioned in the light collecting region such that a termination of the blind aperture is spaced apart from the chamber by at least a portion of the second, solid material. At least one refracting surface is disposed in the housing between the open aperture and the light collecting region such that the optical axis of the housing passes through the at least one refracting surface. Various embodiments of optical connectors will be described in further detail herein with specific reference to the appended drawings.

Referring now to FIG. 1, a side view of an optical connector 100 is schematically depicted. The optical connector 100 comprises a housing 110 having an open aperture 113 at a first end 111 and a blind aperture 114 at a second end 112. The first end 111 and the second end 112 are positioned at opposite ends of an optical axis 190 of the optical connector 100 (i.e., the optical axis of the housing 110). In some embodiments, the open aperture 113 and the blind aperture 114 are positioned such that the optical axis 190 passes through and is coaxial with the open aperture 113 and the blind aperture 114. The optical connector 100 further comprises a chamber 130, a light collecting region 140, and a refracting surface 150, each positioned in the interior volume 120 of the housing 110 along the optical axis 190. The chamber 130 is disposed adjacent to the open aperture 113 and the light collecting region 140 is disposed adjacent to the blind aperture 114. Further, the refracting surface 150 is disposed between the chamber 130 and the light collecting 140.

In some embodiments, the optical connector 100 may be monolithic, such as when the optical connector 100 is molded or formed from a single piece of material. For example, a single piece of transparent material may be formed to include the individual components of the optical connector 100, such as the housing 110, the open aperture 113, the blind aperture 114, the chamber 130, the light collecting region 140, and the refracting surface 150. Alternatively, the optical connector 100 may be formed from multiple individual components assembled together. For example, the housing 110 may be formed in two discrete halves which are coupled together with one or more fasteners and/or adhesives.

Referring still to FIG. 1, the housing 110 of the optical connector 100 may be made from an optically transparent material. For example, in some embodiments, the housing 110 may be formed from a molded polymer manufactured using any known polymeric molding technology, such as, for example, injection molding. The molded polymer of the housing 110 may comprise an acrylic polymer, PMMA, polycarbonate, polystyrene, acrylic, cyclic olefin polymer (e.g. Zeonex™), Ultem™, clear PVC, or clarified polyolefins. Alternatively, the housing 110 may be made from glass. In these embodiments, the glass may be shaped into the housing using precision grinding and polishing methods, single point diamond turning methods, molding to an optical finish, molding to a near-net shape and finishing via grind and polish, press-molding a composite glass forming powder into a near-net shape and consolidating (i.e. melting) at high temperature or via hot isostatic pressing (HIP) to convert to a solid glass housing, or other, similar methods used for shaping glass. The material of the housing 110 may be transparent, formable, and optically transmissive, allowing light to pass from a first end 111 to a second end 112. In embodiments, the housing 110 may be 10-30 mm in length, for example 20 mm. In embodiments, the housing 110 may be 5-15 mm in diameter, for example 10 mm. In embodiments, the housing 110 can align a light source and an optical fiber at opposing ends of the housing 110 to facilitate efficient coupling of light from the light source to the optical fiber, such as the embodiments depicted in FIGS. 2-5, below.

The housing 110 comprises an open aperture 113 located at the first end 111 of the housing 110. The open aperture 113 comprises a receiving portion 117 for receiving and securing a light source 160 (FIG. 2) in the housing 110. The open aperture 113 may also include a seat 240 disposed between the receiving portion 117 and the chamber 130. The seat 240 may be used as a datum that regulates the depth of insertion of the light source 160 in the housing 110 and also provides a bonding surface to which the light source 160 may be mechanically or adhesively coupled.

Figure 2:
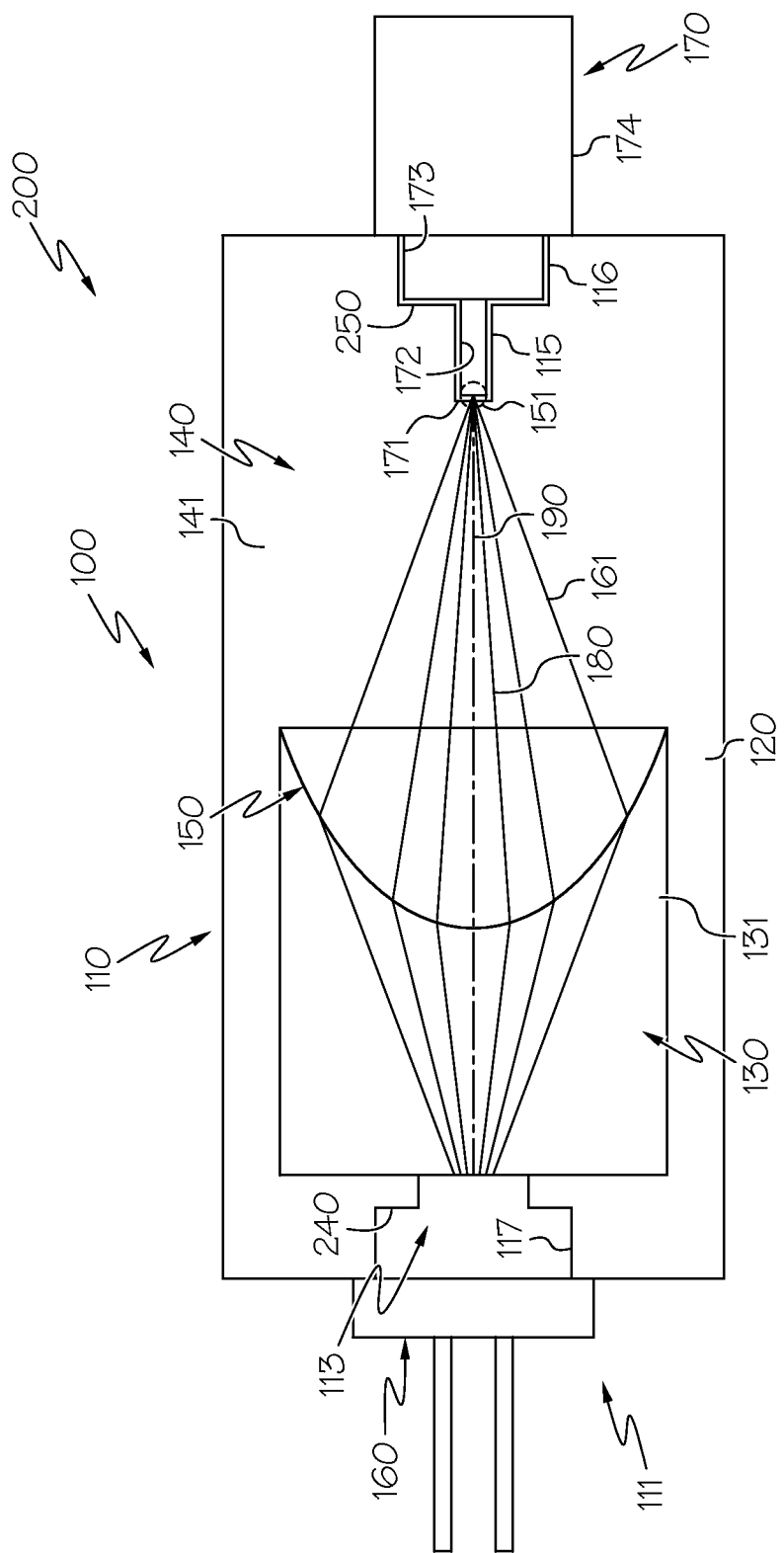
FIG. 2 schematically depicts a side view of an optical assembly including an optical connector coupled to a light source and an optical fiber according to one or more embodiments shown or described herein.

In some embodiments, the housing 110 further comprises a blind aperture 114 located at the second end 112 of the housing 110. The blind aperture 114 extends from the second end 112 of the housing 110 into the light collecting region 140 and terminates in the light collecting region 140. In some embodiments, the depth of the blind aperture 114 may be from about 1 mm to about 2 mm, for example, about 1.5 mm. The blind aperture 114 may be constructed to receive various portions of an optical fiber 170 (FIG. 2). When the optical fiber 170 is positioned in the blind aperture 114, an input face 171 of the optical fiber 170 is generally co-located or coincident with the termination of the blind aperture 114 in the light collecting region 140 of the housing 110. For example, in some embodiments, the blind aperture 114 may comprise a cladding receiving portion 116, a core receiving portion 115, and a fiber seat 250 disposed between the cladding receiving portion 116 and the core receiving portion 115. In some embodiments, the core receiving portion 115 is sized to receive a stripped core portion (i.e., the waveguide 172) of an optical fiber 170 while the cladding receiving portion 116 is sized to receive a portion of the optical fiber 170 with the cladding and/or coating intact around the core portion.

Accordingly, it should be understood that, in some embodiments, the diameter of the cladding receiving portion 116 is larger than the diameter of the core receiving portion 115. For example, the core receiving portion 115 may have a diameter from about 100 μm to about 300 μm, such as, for example about 200 μm, and the cladding receiving portion 116 may have a diameter from about 300 μm to about 700 μm, such as, for example about 500 μm. In some embodiments (not shown), the cladding receiving portion 116 and the core receiving portion 115 may have substantially the same diameters, such as when the blind aperture 114 is sized to receive a stripped optical fiber or, alternatively, a clad optical fiber. When the diameters of the cladding receiving portion 116 and the core receiving portion 115 are substantially equivalent, the blind aperture 114 may not comprise a fiber seat 250.

The housing 110 may comprise a mechanical retention device (not shown) for retaining the optical fiber 170 in the blind aperture 114. For example, in one embodiment (not shown), the blind aperture 114 may comprise one or more resilient barbs extending from the sidewall of the blind aperture 114 in a direction towards the termination of the blind aperture 114 in the light collecting region 140. The resilient barbs flex towards the walls of the blind aperture 114 to allow an optical fiber 170 to be inserted in the blind aperture 114 and engage with the cladding and/or core portion of the optical fiber 170 to resist the withdrawal of the optical fiber 170 from the blind aperture 114.

Alternatively, the core receiving portion 115, the cladding receiving portion 116, or both may include a gripping member. For example, one or more cams (not shown) which can be rotated to increase or decrease the diameter of the core receiving portion 115 and the cladding receiving portion 116 of the blind aperture 114 may be positioned in the blind aperture 114. The cams may be biased into contact with the cladding and/or coating of the optical fiber 170 when the optical fiber 170 is installed in the blind aperture 114, thereby preventing the optical fiber 170 from being withdrawn. The engagement with the optical fiber 170 may be released with a push button located on the housing 110 which, when depressed, pivots the cam out of engagement with the optical fiber 170. In an alternative example, the blind aperture 114 may further comprise one or more levered grippers (not shown), that can engage and disengage with the core receiving portion 115 or the cladding receiving portion 116. One end of a levered gripper can press into the core receiving portion 115 or the cladding receiving portion 116 engaging the blind aperture 114 and an optical fiber 170. Multiple levered grippers can be positioned around the blind aperture 114 and can be individually biased into contact with the core receiving portion 115 or the cladding receiving portion 116. Alternatively, multiple levered grippers can be biased into contact with the core receiving portion 115 or the cladding receiving portion 116 by a single actuator.

In other embodiments, the blind aperture 114 may be coupled to an optical fiber 170 with an interference fit. In an interference fit, the diameter of the core receiving portion 115 can be substantially equivalent to the diameter of the waveguide 172 of the optical fiber 170 and the diameter of the cladding receiving portion 116 can be substantially equivalent to the diameter of the cladding layer 173 of the optical fiber 170. Friction between the surfaces of the blind aperture 114 and the optical fiber 170 retains the optical fiber 170 within the blind aperture 114.

Referring still to FIG. 1, the housing 110 may also include a light collecting region 140 disposed between the chamber 130 and the blind aperture 114 in the interior volume 120 of the housing 110 such that the optical axis 190 passes through the light collecting region 140. The light collecting region 140 can be positioned in the housing 110 such that the termination of the blind aperture 114 is substantially co-located with a portion of the light collecting region 140 and spaced apart from the chamber 130 by at least a portion of the material 141 of the light collecting region 140. In some embodiments, the light collecting region 140 is integrally formed with the housing 110, such as when the housing 110 and the light collecting region 140 are molded from the same material. Alternatively the light collecting region 140 and the housing 110 may be co-molded from different materials. In some embodiments, the light collecting region 140 may be from about 5 mm to about 15 mm in length, for example 7 mm or 14 mm.

In the embodiment shown in FIG. 1, the light collecting region 140 functions as a light pipe for guiding light from the chamber 130 to the blind aperture 114. As such, the light collecting region 140 is generally formed from a solid, optically transparent material 141 such as, for example, glass or a polymer material such as acrylic polymers, PMMA, polycarbonate, polystyrene, acrylic, cyclic olefin polymer (e.g. Zeonex™) Ultemv™, clear PVC, or clarified polyolefins. In embodiments described herein, the material 141 of the light collecting region 140 is different from the material 131 of the chamber 130 and, in some embodiments, can be the same material as the material of the housing 110.

Referring still to FIG. 1, the housing 110 may further include a chamber 130 positioned adjacent to the open aperture 113 in an interior volume 120 of the housing 110 between the open aperture 113 and the light collecting region 140 such that the optical axis 190 passes through the chamber 130. In some embodiments, the termination of the chamber 130 proximate to the light collecting region 140 is substantially co-located with the refracting surface 150. The chamber 130 may be from about 5 mm to about 15 mm in length, for example 7 mm or 14 mm. The chamber 130 generally comprises a hollow or open volume within the interior volume 120 of the housing 110 which contains a material 131 different than that of the housing 110 and the material 141 of the light collecting region 140. In some embodiments, the material 131 of the chamber 130 comprises a gas, such as air and the material 141 of the light collecting region 140 comprises a second, solid material.

In some embodiments, the material 131 of the chamber 130 may comprise an index matching material, such as an index matching gel, oil, or a cured optical adhesive. The index matching material may be a material which is compositionally different than the material 141 of the light collecting region 140, but has an index of refraction that is similar to or the same as the index of refraction of the material 141 of the light collecting region 140 in order to assist in collecting the light from the chamber 130 and propagating the light through the light collecting region 140. As a non-limiting example, the material 141 of the light collecting region 140 may comprise a silicon polymer having an index of refraction of 1.5 and the material 131 of the chamber 130 may comprise an index matching material, such as a gel, having an index of refraction of 1.5. In other embodiments, the material 131 of the chamber 130 may comprise an index matching material having an index of refraction different than the index of refraction of the material 141 of the light collecting region 140. For example, the index of refraction of material 131 may be greater than 1 but less than the index of refraction of the material 141 of the light collecting region 140.

Referring still to FIG. 1, the housing 110 may further comprise at least one refracting surface 150 disposed in the housing 110 between the open aperture 113 and the light collecting region 140 such that the optical axis 190 of the housing 110 passes though and is coaxial with the refracting surface 150. The refracting surface 150 is constructed to focus and converge light propagating through the chamber 130 into the light collecting region 140. Accordingly, in some embodiments, the focal point 151 of the refracting surface 150 is located within the light collecting region 140, such as when the focal point 151 of the refracting surface 150 is coincident or co-located with the termination of the blind aperture 114. Co-locating the focal point 151 with the termination of the blind aperture 114 is dependent on the radius of curvature of the refracting surface 150, the index of refraction of the refracting surface 150, the index of refraction of the material 141 of the light collecting region 140, and the length of the light collecting region 140. For example, if the material 141 of the light collecting region 140 and the material of the refracting surface 150 comprise a polymer having a index of refraction of 1.5 and the length of the light collecting region is 5 mm, than the radius of curvature of the refracting surface 150 should be about 1.25 mm for the focal point of the refracting surface 150 to be substantially co-located with the termination of the blind aperture 114.

In some embodiments, the refracting surface 150 may be the same material 141 as the light collecting region 140, such as a glass or a polymer. Alternatively, the refracting surface 150 may be formed from a different material. In embodiments where the optical connector 100 is monolithic, the refracting surface 150 may be integral with and molded into the housing 110. In other embodiments, the refracting surface 150 may be formed separate from the housing 110 and may be coupled to the light collecting region 140 of the housing 110. For example, the refracting surface 150 may be coupled to the light collecting region 140 mechanically, by adhesive, or combinations thereof. The refracting surface 150 may also be co-molded with the housing 110.

In some embodiments, the refracting surface 150 may comprise a lens, for example a spherical lens, an aspherical lens, or a kinoform lens. In other embodiments, the refracting surface 150 may be a diffractive surface or a planar surface. When the refracting surface 150 is planar, light from a light source coupled to the optical connector 100 can start as divergent light, pass through the refracting surface 150, travel into the light collecting region 140, and continue to diverge toward the termination of the blind aperture 114 which may be substantially co-located with an input face of an optical fiber. In this embodiment, the housing 110, including the refracting surface 150 and the light collecting region 140, couples a light source to an optical fiber by creating geometric overlap between the optical fiber and the light of the light source at the input face of the optical fiber.

Referring now to FIG. 2, the optical connector 100 may be utilized in an optical assembly 200 to couple light 161 from a light source 160 into an optical fiber 170. For example, the optical assembly 200 may include a light source 160 coupled to the open aperture 113 of the housing 110 and an optical fiber 170 coupled to the blind aperture 114 of the housing 110. In this embodiment, the light source 160 is coupled to the housing 110 such that light 161 emitted from the light source 160 enters the chamber 130 of the housing 110, travels along an optical path 180, and reaches an input face 171 of the optical fiber 170. The optical path 180 is substantially co-located with the optical axis 190 of the housing 110. In some embodiments, the optical path 180 passes through the chamber 130, the refracting surface 150, and the light collecting region 140. Light 161 propagates through the light collecting region 140 from the refracting surface 150 located at one end of the light collecting region 140 to an input face 171 of an optical fiber 170. In some embodiments, the light 161 from the light source 160 is divergent light that passes through the refracting surface 150 where it is focused onto a focal point 151 of the refracting surface 150. For example, in some embodiments, the focal point 151 of the refracting surface 150 is substantially co-located with the input face 171 of the optical fiber 170 in the light collecting region 140.

Referring still to FIG. 2, the optical assembly 200 is schematically depicted with a light source 160 positioned in the receiving portion 117 of the open aperture 113 and engaged with the seat 240 of the open aperture 113. In the embodiments described herein, the light source 160 may be a laser diode, an LED, a red-green-blue (RGB) laser diode or LED, or a white light source. In some embodiments, the light source 160 may comprise multiple emitters, such as, for example, multiple laser diodes, multiple LEDs, or individual red, green, and blue laser diodes or LEDs. In some embodiments, the light source 160 may be packaged in a standardized transistor-outline (TO) can package to facilitate coupling with the open aperture 113. In some embodiments the light source 160 may have a window through which light is emitted and in some other embodiments, the light source 160 may be windowless. In some embodiments, the light source 160 may be engaged with the receiving portion 117 through an interference fit, a mechanical connection, adhesives, or combinations thereof. The receiving portion 117 centers the light source 160 in the open aperture 113 such that the light source 160 emits light 161 along the optical axis 190 from the first end 111 to the second end 112 of the housing 110. The receiving portion 117 also positions the light source 160 such that the light source 160 is spaced apart from the light collecting region 140 and at least one refracting surface 150 by the length of the chamber 130.

Referring still to FIG. 2, the optical assembly 200 is schematically depicted with an optical fiber 170 positioned in the blind aperture 114 of the housing 110. The optical fiber 170 may engage with the blind aperture 114 using an interference fit, a mechanical connection (i.e., utilizing set screws, a threaded can package or the like), an adhesive, or combinations thereof. For example, in some embodiments, the core receiving portion 115 of the blind aperture 114 can engage with the waveguide 172 of the optical fiber 170. In this embodiment, the cladding layer 173 and the coating layer 174 of the optical fiber 170 can be removed from a portion of the optical fiber 170 exposing the waveguide 172 which is inserted in the core receiving portion 115 of the blind aperture 114. By removing the cladding layer 173 and the coating layer 174, the waveguide 172 directly engages with the core receiving portion 115 of the blind aperture 114. In this embodiment, the coating layer 174 is removed from a portion of the optical fiber 170 adjacent to the exposed waveguide 172, exposing the cladding layer 173 which enters the cladding receiving portion 116 of the blind aperture 114 when the optical fiber 170 is inserted into the blind aperture 114 and engages directly with the cladding receiving portion 116. A portion of the optical fiber 170 may be bonded to a portion of the blind aperture 114. For example, in some embodiments, the cladding of the optical fiber 170 may be adhesively bonded to the fiber seat 250 to retain the optical fiber 170 in the blind aperture 114. In the embodiments described herein, when the optical fiber 170 is positioned in the blind aperture 114, the input face 171 of the optical fiber 170 is generally co-located or coincident with the termination of the blind aperture 114 in the light collecting region 140 of the housing 110.

Figure 3:
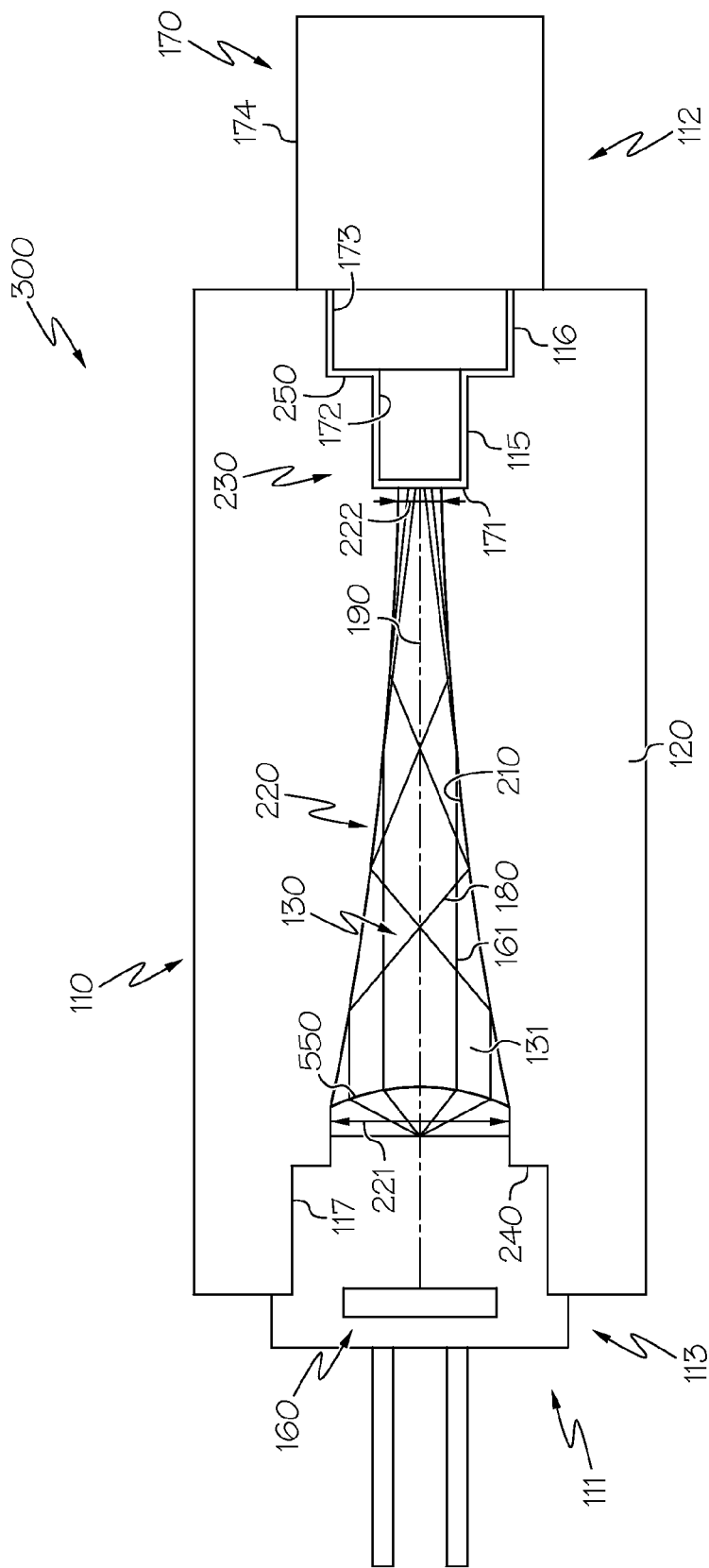
FIG. 3 schematically depicts a side view of an optical connector having a first open aperture, a second open aperture, and a tapered chamber, according to one or more embodiments shown or described herein.

Referring now to FIG. 3, another embodiment of an optical connector 300 is depicted. In this embodiment, the optical connector 300 includes a housing 110 with a first end 111 and a second end 112 positioned at opposite ends of an optical axis 190 of the housing 110. A collimating lens 550 and a chamber 130 are disposed in an interior volume 120 of the housing 110. The chamber 130 comprises a sidewall 220. For example, the chamber 130 may be substantially circular in cross section and, as such, comprises a single sidewall 220 which defines the chamber 130. The chamber 130 may further comprise a reflecting material 210 positioned on the sidewall 220 of the chamber 130. For example, in some embodiments, the sidewall 220 may be mirrored with a highly reflective dielectric reflector or metallic coating, such as silver, gold, aluminum or the like. In some embodiments, the housing 110 may be made from a monolithic piece of material, for example, a single piece of polymer or glass. Alternatively, the housing 110 may be constructed from discrete segments coupled together with adhesives and/or mechanical fasteners. In a multiple piece embodiment, the housing 110 may comprise a first half and a second half disposed on opposite sides of a plane parallel to the optical axis 190 of the housing 110 and coupled together along the plane parallel to the optical axis 190. In some embodiments, the light source 160 may be packaged in a standardized transistor-outline (TO) can package to facilitate coupling with the open aperture 113. In some embodiments the light source 160 may have a window through which light is emitted and in other embodiments the light source 160 may be windowless.

Still referring to FIG. 3, the chamber 130 tapers from the first end 111 to the second end 112, creating an optical "funnel" which concentrates light propagating through the chamber 130. For example, the chamber 130 can taper from the first end 111 to the second end 112 of the housing 110 such that a first diameter 221 of the chamber 130 at the opening of the chamber 130 and near the first end 111 of the housing 110 is larger than a second diameter 222 of the chamber 130 at the termination of the chamber 130 and near the second end 112 of the housing 110. The tapered chamber 130 may be shaped in a variety of parabolic or cone-like configurations. For example, the tapered chamber 130 may be an optical horn (i.e., the diameter of the chamber 130 decreases exponentially from the first end 111 to the second end 112), a reverse flare, a truncated cone, a parabola or the like.

Still referring to FIG. 3, in one embodiment, the optical connector 300 can include a first open aperture 113 at the first end 111 of the housing 110 and a second open aperture 230 at the second end 112 of the housing 110. The first open aperture 113 may be configured similar to the open aperture described above with respect to FIGS. 1 and 2. The second open aperture 230 may be configured similar to the blind aperture 114 described above with respect to FIGS. 1 and 2, albeit opening directly into the chamber 130. A light source 160 can be coupled to the first open aperture 113 and an optical fiber 170 can be coupled to the second open aperture 230 as described above with respect to FIG. 2. For example, an optical fiber 170 can be positioned in the second open aperture 230 such that an input face 171 of the optical fiber 170 is positioned at the termination of the chamber 130.

Still referring to FIG. 3, in some embodiments, a collimating lens 550 is positioned at the first end 111 of the housing 110 adjacent to the tapered chamber 130. The first diameter 221 of the chamber 130 at the opening of the chamber 130 is substantially the same as the diameter of the collimating lens 550. The chamber 130 tapers to the second, smaller diameter 222 at the termination of the chamber 130, substantially co-located with the input face 171 of the optical fiber 170. The second diameter 222 is smaller than the diameter of both the waveguide 172 and the input face 171 of the optical fiber 170. In this embodiment, the tapered chamber 130 can concentrate light 161 incident onto a portion of the input face 171 of the optical fiber 170.

The collimating lens 550 is substantially co-located with the termination of a first open aperture 113 and the opening of the tapered chamber 130. The collimating lens 550 may be the same material 141 as the light collecting region 140, such as a glass or a polymer. Alternatively, the collimating lens 550 may be formed from a different material. In embodiments where the optical connector 300 is monolithic, the collimating lens 550 may be integral with and molded into the housing 110. In other embodiments, the collimating lens 550 may be formed separate from the housing 110 and may be coupled to the first open aperture 113 of the housing 110 or coupled to the sidewalls 220 of the chamber 130, for example, mechanically, by adhesive, or combinations thereof. The collimating lens 550 may be positioned between the termination of the first open aperture 113 and the chamber 130. The collimating lens 550 may also be co-molded with the housing 110. In other embodiments, the collimating lens 550 may form part of the light source 160 or the window of the light source.

Still referring to FIG. 3, the housing 110 includes an optical axis 190 that passes through the first open aperture 113, the collimating lens 550, the chamber 130, and the second open aperture 230. When a light source 160 is coupled to the first end 111 of the housing 110 and the light source 160 is powered on, divergent light 161 emitted from the light source 160 propagates along the optical axis 190 towards an optical fiber coupled to the second end 112 of the housing 110. The light 161 passes through the collimating lens 550, collimating and directing the light 161 into the chamber 130. As the collimated light 161 propagates through the chamber 130, the light 161 is reflected by the reflecting material 210 positioned on the sidewall 220 of the chamber 130. As the collimated light 161 propagates along the optical path 180, the tapered shape of the chamber 130 concentrates the collimated light 161 proximate to the second end 112 of the housing 110 incident onto the input face 171 of the optical fiber 170.

In embodiments, the optical connector 300 can further include a refracting surface (not shown) and a light collecting region (not shown) positioned between the termination of the chamber 130 and the second end 112, similar to the embodiments depicted in FIGS. 1 and 2. In this embodiment, light 161 emitted from the light source 160 passes through the collimating lens 550 and the chamber 130 and reflects from the tapered sidewall 220 of the chamber 130 such that the light 161 is concentrated on the refracting surface. The refracting surface focuses the collimated light onto a focal point of the refracting surface in the light collecting region, substantially co-located with an input face 171 of an optical fiber 170, thereby directing a high power density of light 161 incident onto the input face 171 of the optical fiber 170.

It should now be understood that the optical connectors described herein may be used to efficiently converge divergent light emitted from a light source onto the input face of an optical fiber thereby efficiently coupling light from that light source into that optical fiber. Such optical connectors may be readily employed in conjunction with transmission optical fibers and/or light-diffusing fibers used in lighting applications. Such optical fibers are particularly well suited for use in lighting applications as the connectors provide a mechanism for quickly coupling and/or decoupling a light source to an optical fiber. The connectors described herein may also be used to simultaneously couple light into both ends of the optical fiber. Moreover, because the optical connectors can be readily manufactured using conventional molding and/or machining techniques, the optical connectors provide a low cost solution for efficiently coupling a light source into an optical fiber without the need for complicated optical components or external alignment equipment.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical connector comprising:
   a housing having a first end and a second end positioned at opposite ends of an optical axis of the housing, the first end of the housing having an open aperture;
   a chamber disposed in an interior volume of the housing such that the optical axis of the housing passes through the chamber, the chamber having an opening located at a termination of the open aperture of the first end of the housing and a reflecting material positioned on a sidewall of the chamber, wherein the chamber tapers from the first end of the housing to the second end of the housing such that a first diameter of the chamber at the first end of the housing is larger than a second diameter of the chamber at the second end of the housing;
   a light source coupled to the open aperture of the first end of the housing wherein, when the light source is powered on, divergent light from the light source propagates through the chamber and is reflected by the reflecting material to concentrate the light proximate the second end of the housing; and
   a collimating lens positioned within the housing and co-located with the termination of the open aperture of the first end of the housing and the opening of the chamber.

2. The optical connector of claim 1, further comprising an optical fiber coupled to the second end of the housing such that an input face of the optical fiber is disposed in the chamber wherein, when the light source is powered on, the concentrated light is incident on the input face of the optical fiber.

3. The optical connector of claim 2, wherein the second diameter of the chamber is smaller than a diameter of the input face of the optical fiber.

4. The optical connector of claim 1, wherein the first diameter of the chamber is substantially the same as a diameter of the collimating lens.

5. The optical connector of claim 1, wherein the housing comprises a glass or a polymer.

6. The optical connector of claim 1, wherein the collimating lens comprises a glass or a polymer.

7. The optical connector of claim 1, wherein a diameter of the chamber decreases exponentially between the first diameter of the chamber and the second diameter of the chamber as the chamber tapers from the first end of the housing to the second end of the housing.

8. The optical connector of claim 1, wherein the reflecting material comprises a metallic coating.

9. The optical connector of claim 8, wherein the metallic coating comprises silver, gold, or aluminum.

10. The optical connector of claim 1, wherein the light source is a laser diode or a light emitting diode (LED).

11. The optical connector of claim 1, wherein the second end of the housing comprises an open aperture.

12. The optical connector of claim 11 wherein the chamber opens directly into the open aperture of the second end of the housing.

13. The optical connector of claim 1, wherein the second end of the housing comprises a blind aperture.

14. The optical connector of claim 13, wherein the blind aperture of the second end of the housing comprises a cladding receiving portion and a core receiving portion.

15. The optical connector of claim 13, wherein the housing further comprises a light collecting region disposed between the chamber and the blind aperture of the second end of the housing.

16. The optical connector of claim 15, wherein the light collecting region comprises a polymer or a glass.

17. The optical connector of claim 15, further comprising at least one refracting surface disposed in the housing between the open aperture of the first end of the housing and the light collecting region.

18. The optical connector of claim 17, wherein a termination of the blind aperture of the second end is positioned at a focal point of the at least one refracting surface.

19. The optical connector of claim 17, wherein the at least one refracting surface is a spherical lens, an aspherical lens, a kinoform lens, a diffractive surface, or a planar surface.

20. The optical connector of claim 1, wherein the open aperture of the first end of the housing comprises a seat disposed between the first end of the housing and the chamber.

* * * * *